(12) United States Patent
Rubel

(10) Patent No.: US 11,639,778 B2
(45) Date of Patent: *May 2, 2023

(54) SOLAR POWERED LIGHTING ELEMENT WITH SIMULATED FLAME AND ELECTRICAL INSECT ELIMINATOR

(71) Applicant: PIC Corporation, Linden, NJ (US)

(72) Inventor: Eric Rubel, Westfield, NJ (US)

(73) Assignee: PIC Corporation, Linden, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,047

(22) Filed: Feb. 10, 2022

(65) Prior Publication Data
US 2022/0163176 A1    May 26, 2022

Related U.S. Application Data

(63) Continuation of application No. 17/220,144, filed on Apr. 1, 2021, now Pat. No. 11,293,610, which is a
(Continued)

(51) Int. Cl.
*F21S 10/04*    (2006.01)
*F21S 9/03*    (2006.01)
(Continued)

(52) U.S. Cl.
CPC .............. *F21S 10/04* (2013.01); *A01M 1/04* (2013.01); *A01M 1/22* (2013.01); *F21S 9/037* (2013.01);
(Continued)

(58) Field of Classification Search
CPC .......... A01M 1/04; A01M 1/22; A01M 1/223; F21S 10/04; F21S 10/043; Y02B 20/40; Y02B 20/72

See application file for complete search history.

(56) References Cited

U.S. PATENT DOCUMENTS 3,835,577 A    9/1974    Soulos
4,248,005 A    2/1981    Hedstrom
(Continued)

FOREIGN PATENT DOCUMENTS

CN    200996592 Y    12/2007
CN    204554684 U    8/2015
(Continued)

OTHER PUBLICATIONS

International Search Report and Written Opinion dated Jul. 22, 2020 issued in corresponding International Application No. PCT/US20/29914.
(Continued)

*Primary Examiner* — Zheng Song
(74) *Attorney, Agent, or Firm* — Amster, Rothstein & Ebenstein LLP

(57) ABSTRACT

A solar powered lighting element with a simulated flame and an electric insect eliminator includes a lighting portion with a conducting grid and a light portion that simulates a flickering flame which are powered by a rechargeable battery that is recharged using a solar panel. One or more UV light elements are provided in addition to the flickering flame to attract insects.

20 Claims, 10 Drawing Sheets

Related U.S. Application Data continuation of application No. 16/858,309, filed on Apr. 24, 2020, now Pat. No. 11,002,417.

(60) Provisional application No. 62/839,363, filed on Apr. 26, 2019.

(51) Int. Cl.
  *A01M 1/22* (2006.01)
  *A01M 1/04* (2006.01)
  *F21Y 115/10* (2016.01)
(52) U.S. Cl.
  CPC ............ *A01M 1/223* (2013.01); *F21S 10/043* (2013.01); *F21Y 2115/10* (2016.08)

(56) References Cited

U.S. PATENT DOCUMENTS

| | | | |
|---|---|---|---|
| 4,271,626 A | 6/1981 | Mulee et al. | |
| 4,490,937 A | 1/1985 | Yavnieli | |
| 4,951,414 A * | 8/1990 | Mewissen | A01M 1/223 43/112 |
| 6,195,932 B1 | 3/2001 | Aicher | |
| 6,568,124 B1 | 5/2003 | Wilbanks | |
| 6,786,001 B1 * | 9/2004 | Piper | A01M 1/04 43/113 |
| 8,319,649 B1 | 11/2012 | Devane | |
| 2005/0172542 A1 * | 8/2005 | Rose, Sr. | A01M 1/145 43/113 |
| 2009/0277073 A1 | 11/2009 | Chen | |
| 2017/0006848 A1 * | 1/2017 | Barroso | A01M 1/04 |
| 2017/0258068 A1 * | 9/2017 | Eom | A01M 1/106 |
| 2018/0199563 A1 * | 7/2018 | Zheng | A01M 1/106 |
| 2018/0263234 A1 | 9/2018 | Sasaki et al. | |
| 2018/0271080 A1 | 9/2018 | Kim et al. | |
| 2018/0343846 A1 * | 12/2018 | Horne | A01M 1/04 |
| 2019/0090470 A1 * | 3/2019 | Lee | A01M 1/04 |

FOREIGN PATENT DOCUMENTS

| | | |
|---|---|---|
| CN | 205052587 U | 3/2016 |
| EP | 3201524 B1 | 8/2017 |

OTHER PUBLICATIONS

EP Search Opinion with Supplementary European Search Report dated Jan. 3, 2023 issued in European Patent Application No. 20794024.8.

Communication pursuant to Rules 70(2) and 70a(2) EPC dated Jan. 20, 2023 issued in European Patent Application No. 20794024.8.

* cited by examiner

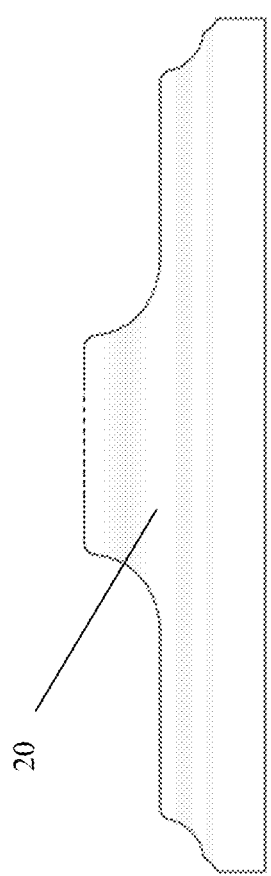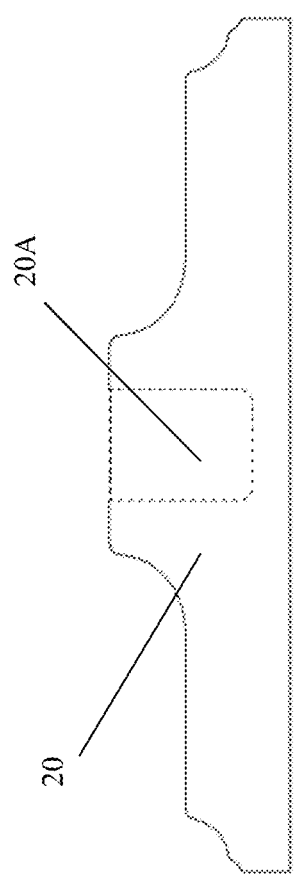

SOLAR POWERED LIGHTING ELEMENT WITH SIMULATED FLAME AND ELECTRICAL INSECT ELIMINATOR

CROSS-REFERENCE TO RELATED APPLICATIONS

The present application is a continuation of and claims priority to and the benefit of U.S. patent application Ser. No. 17/220,144, filed Apr. 1, 2021 which is a continuation of and claims priority to and the benefit of U.S. patent application Ser. No. 16/858,309, filed Apr. 24, 2020, now U.S. Pat. No. 11,002,417, issued May 11, 2021 which claims priority to and the benefit of U.S. Provisional Patent Application Ser. No. 62/839,363, filed Apr. 26, 2019, entitled SOLAR POWERED LIGHTING ELEMENT WITH SIMULATED FLAME AND ELECTRICAL INSECT ELIMINATOR, the entire content of which is hereby incorporated by reference herein.

BACKGROUND

Field of the Disclosure

The present invention relates to a solar powered lighting element with a simulated flame and an electric insect eliminator.

Related Art

Conventional electric insect eliminators are typically focused on pest control and include features that optimize pest removal, however, ignore aesthetics and other useful functionality. While conventional electric insect eliminators often emit UV light to attract insects, they do not provide sufficient light to aid those around them to see. Further, their design is typically not aesthetically pleasing.

Conventional electric insect eliminators are also commonly plugged into an outlet, which limits their portability. Some electric insect eliminators may include batteries, however, this adds to maintenance time and expense, since batteries must be routinely replaced or connected to an outlet for charging.

Accordingly, it would be beneficial to provide a lighting element with an electric insect eliminator that avoids these and other problems.

SUMMARY

It is an object of the present disclosure to provide a solar powered lighting element with a simulated flame and an electric insect eliminator.

A lighting element in accordance with an embodiment of the present disclosure includes: a light portion configured to emit light, the light portion including: a top portion; at least one cage portion positioned below the top portion; a base portion positioned below the at least one cage portion and connected to the top portion via the at least one cage portion; a UV light portion mounted in the top portion and including one or more UV light sources directing UV light downward; a conducting grid element mounted inside the at least one cage portion; a shade element mounted inside the conducting grid element; and a flickering light source mounted in the shade element and configured to emit light in a predetermined pattern through the shade element; and a support element configured to receive and support the light portion.

In embodiments, the support element includes an elongated pole configured to support the light portion.

In embodiments, the elongated pole includes a plurality of pole segments.

In embodiments, the support element includes a base element configured to receive a portion of the base portion of the light portion.

In embodiments, the at least one cage portion includes: a first cage element positioned on a first side of the lighting element; and a second cage element positioned on a second side of the lighting element, wherein the first cage element and second cage element are connected to each other to form the at least one cage portion.

In embodiments, the UV light source includes a plurality of UV light emitting diodes spaced around an outer periphery of the top portion.

In embodiments, the shade element includes a partially transparent material.

In embodiments, the flickering light source includes a first set of light sources positioned to emit light through the shade element and a second set of light sources positioned to emit light through the shade element, wherein the first set of light sources is activated to emit light in a first pattern, and the second set of light sources is activated to emit light in a second pattern.

In embodiments, the first set of light sources turn on and off alternately in accordance with the first pattern.

In embodiments, the second set of light sources alternate between high brightness and low brightness in accordance with the second pattern.

In embodiments, the first set of light sources and the second set of light sources include a plurality of light emitting diodes.

In embodiments, at least a first light emitting diode of the first set of light sources and the second set of light sources is a first color and a second light emitting diode of the first set of light sources and the second set of light sources is a second color, different from the first color.

In embodiments, the first light emitting diode is part of the first set of light sources and the second light emitting diode is part of the second set of light sources.

In embodiments, the first light emitting diode and second light emitting diode are part of the first set of light sources.

In embodiments, the first light emitting diode and second light emitting diode are part of the second set of light sources.

In embodiments, the lighting element includes at least one control circuit connected to the UV light source, the conducting grid element and the flickering light source and operable to control the UV light source, the conducting grid element and the flickering light source.

In embodiments, the lighting element includes at least one input element, connected to the control circuit, wherein the control circuit controls the UV light source, the conducting grid element and the flickering light source based on information provided via the input element.

In embodiments, the lighting element includes a power source, wherein the power source is connected to the control circuit, and the control circuit controls power supplied to the UV light source, the conducting grid element and the flickering light source.

In embodiments, the lighting element includes a power source and at least one solar panel mounted on a top surface of the top portion and connected to the power source such that the power source is recharged by electricity provided by the at least one solar panel.

In embodiments, the lighting element includes a power source and a charging circuit connected to the power source and configured to recharge the power source.

BRIEF DESCRIPTION OF THE DRAWINGS

The above and related objects, features and advantages of the present disclosure will be more fully understood by reference to the following, detailed description of the preferred, albeit illustrative, embodiments of the present invention when taken in conjunction with the accompanying figures, wherein:

FIG. 5 is a detailed view of a stand suitable for use with the lighting element of FIG. 4 in accordance with an embodiment of the present disclosure;

FIG. 6 is a cross-sectional view of the stand of FIG. 5 in accordance with an embodiment of the present disclosure;

DETAILED DESCRIPTION OF THE EXEMPLARY EMBODIMENTS

Figure 1:
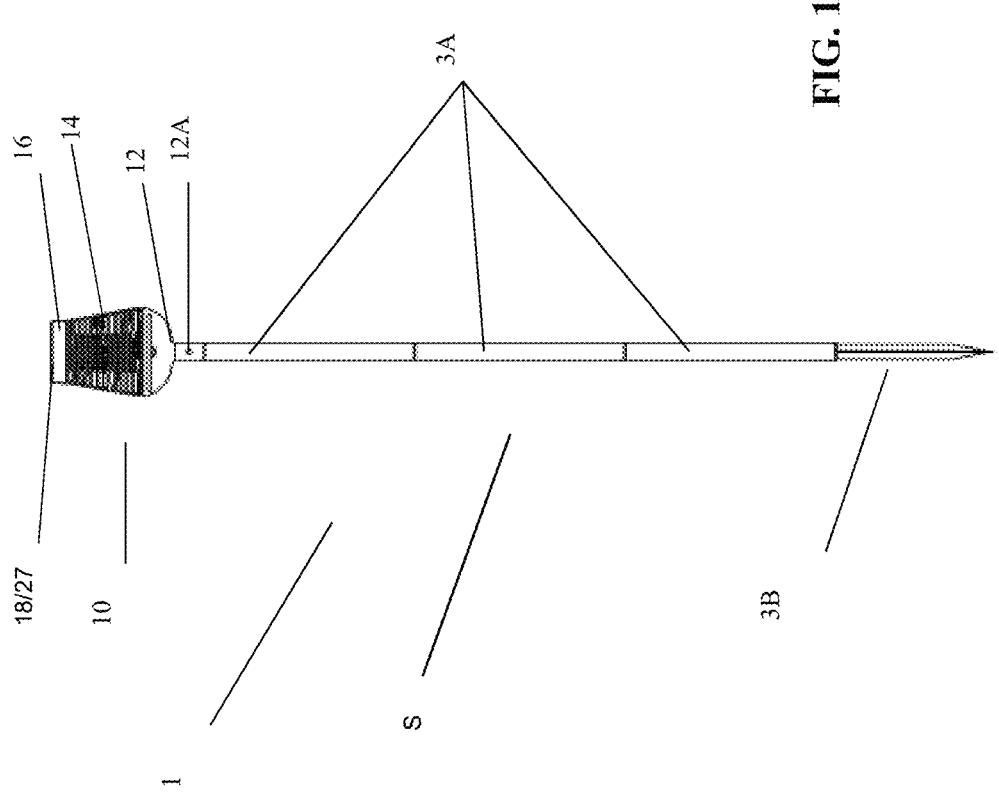
FIG. 1 illustrates a perspective view of a solar powered lighting element with a simulated flame element and an electric insect eliminator in accordance with an embodiment of the present disclosure.
Figure 2:
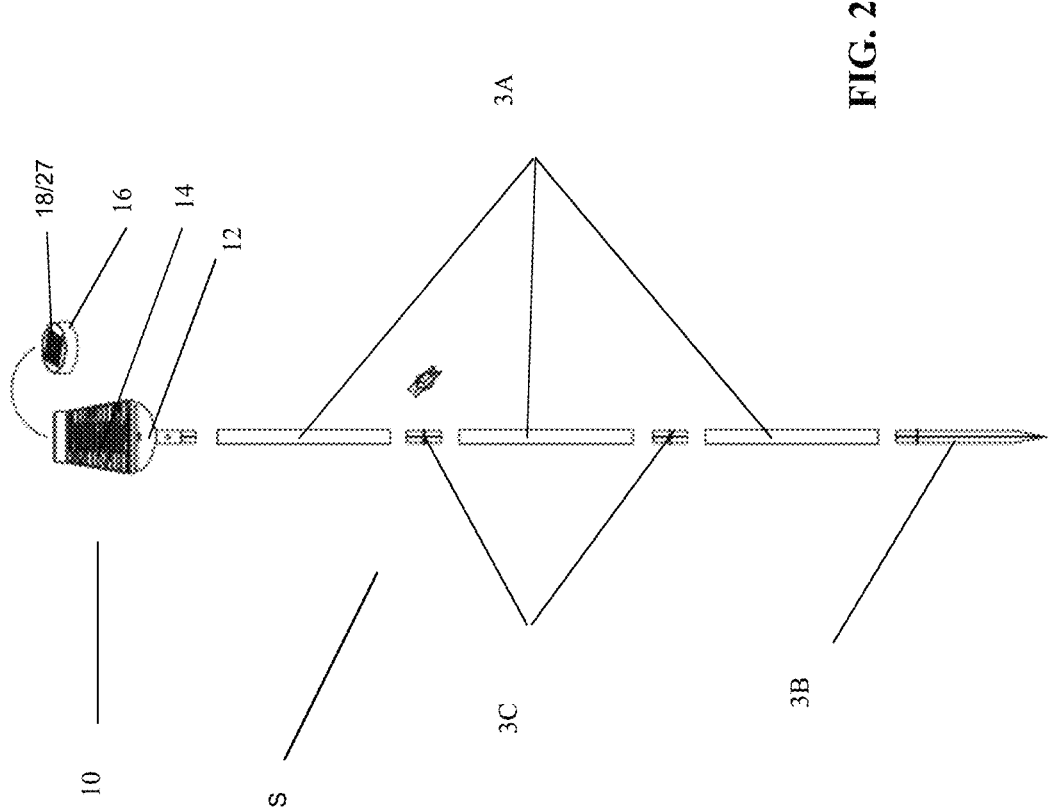
FIG. 2 illustrates a partially exploded view of the solar powered lighting element of FIG. 1 in accordance with an embodiment of the present disclosure.
Figure 3:
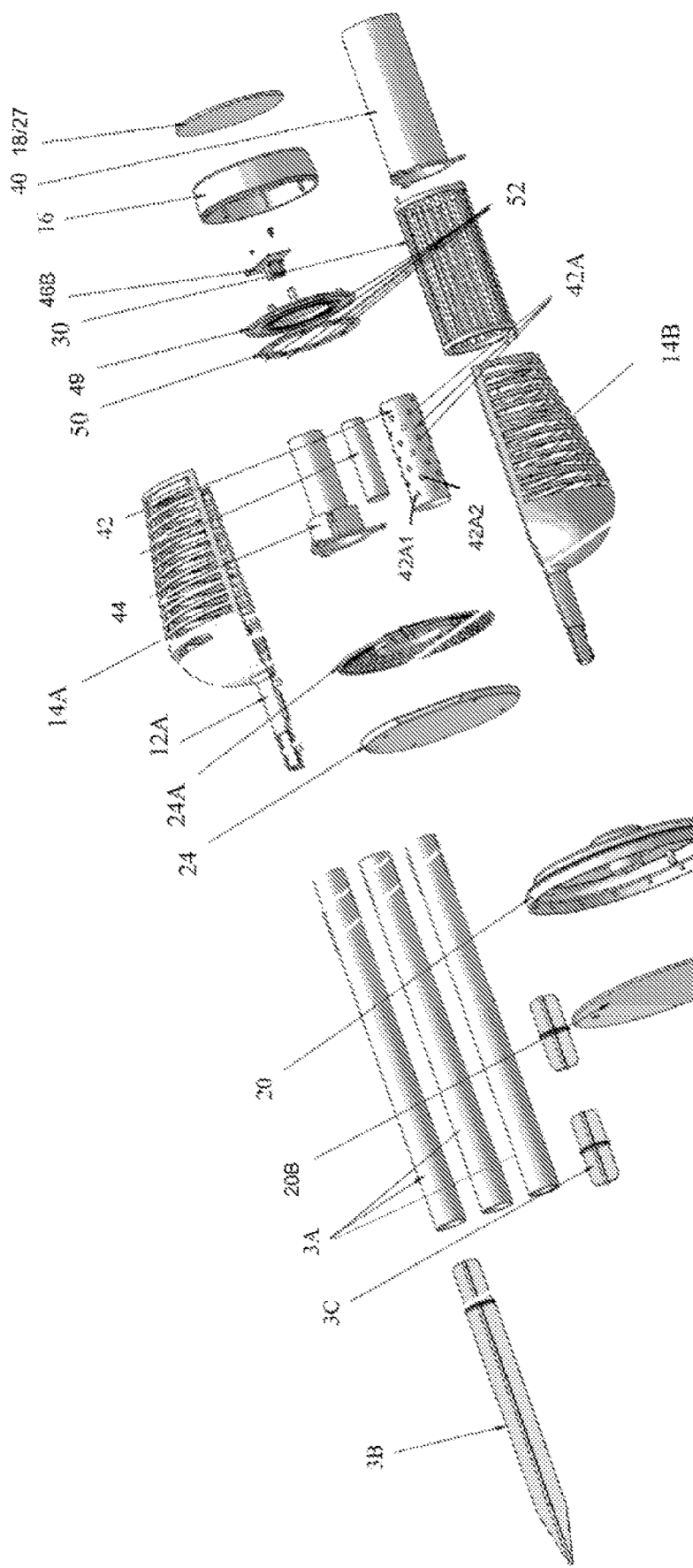
FIG. 3 illustrates an exploded view of the solar powered lighting element of FIG. 1 in accordance with an embodiment of the present disclosure.
Figure 3A:
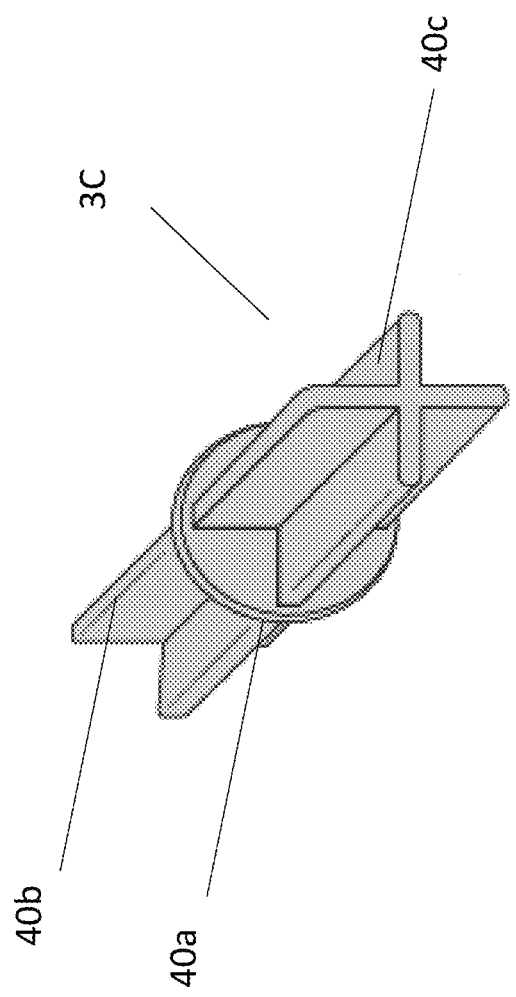
FIG. 3A illustrates a more detailed view of a connector used in the support element used in the lighting element of FIGS. 1-2.

A solar powered lighting element with a simulated flame and an electric insect eliminator 1 in accordance with an embodiment of the present disclosure is illustrated in FIG. 1. In embodiments, a light portion 10 may be positioned on a support element S. In embodiments, the support element S may include a pole 3. A base 12 may be provided on a bottom of the light portion 10 and may be connected to a support element S. In embodiments, the support element S may include the pole 3 via a connector 12A. In embodiments, an angled peg 3B may be provided at a bottom of the pole 3 to allow mounting of the pole in the ground. In embodiments, the pole 3 may include a plurality of pole segments 3A that are joined together by connectors 3C (see FIG. 2, for example). In embodiments, the connectors 3C are configured to connect the pole segments 3A to one another. In embodiments, the connectors 3C are configured to provide a connection and to provide structural integrity to the pole 3. In embodiments, each connector 3C may include a center disk portion 40a with a first end 40b extending in a first direction therefrom and a second end 40c extending in a second direction, opposite the first section, from the center disk portion (see FIG. 3A, for example). In embodiments, the first and second ends 40b, 40c are received in respective ends of adjacent pole segments 3A. In embodiments, the width and length of the first and second ends 40b, 40c are configured to provide a secure connection of sufficient strength to support the base 12 and light portion 10 on the pole 3. In embodiments, a total length of the connector 3C may be about 110 mm. In embodiments, a width of the first and second ends 40b, 40c may be about 21.04 mm and a width of the center disk portion may be wider, about 25.4 mm. In embodiments, these specific dimensions may be varied provided that the connector 3C secures the pole segments 3A together and ensured structural integrity of the pole 3. While FIGS. 1-3 illustrate the use of three pole segments 3A, fewer or more pole segments may be used. In embodiments, the angled peg 3B may include multiple angled and/or sharpened ends to aid in penetrating the ground.

Figure 4:
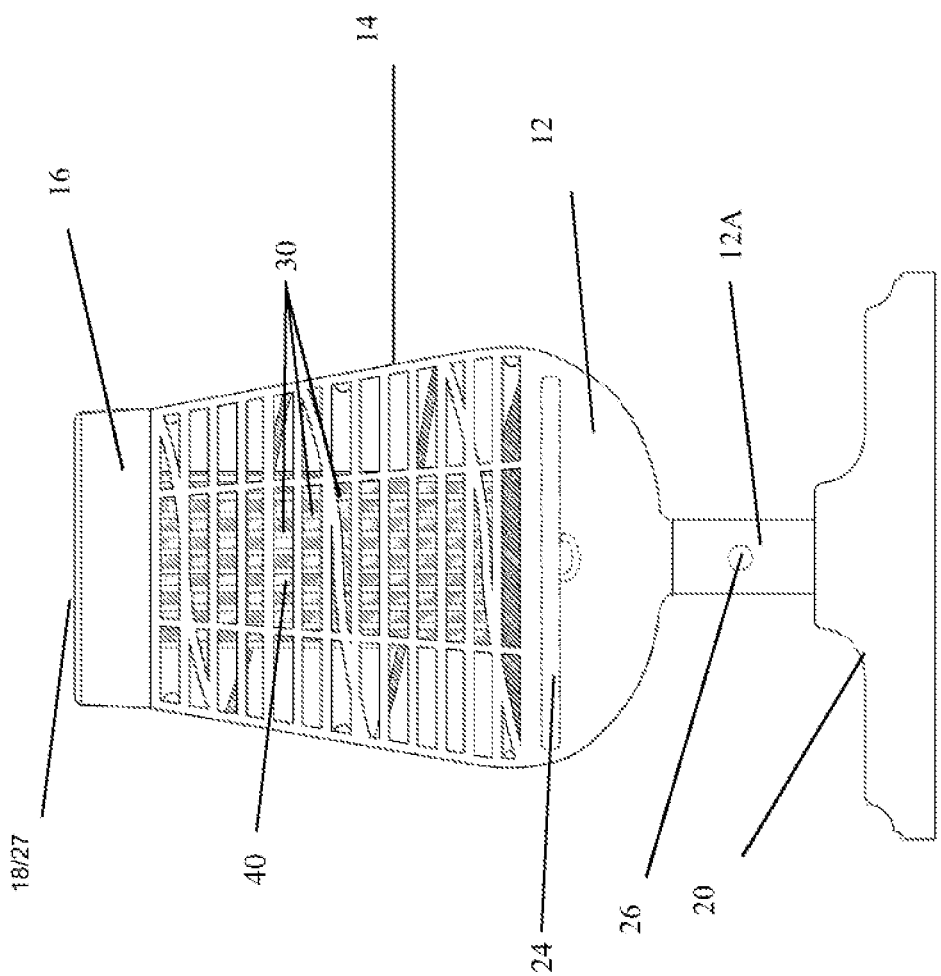
FIG. 4 is a detailed view of a light portion of the lighting element of FIG. 1 in accordance with an embodiment of the present disclosure.

In embodiments, the support element S may include a stand 20 in which the light portion 10 may be mounted, as can be seen in FIG. 4, for example. In embodiments, the stand 20 may include a recess 20A (see FIG. 6, for example) that is sized and shaped to receive the top connector 12A such that the light portion 10 may be mounted on the stand 20 rather than the pole 3. In embodiments, the stand 20 may be substantially hollow and may include a bottom plate 20B (see FIG. 3, for example). In embodiments, when the stand 20 is used, the solar powered lighting element with a simulated flame and an electric insect eliminator 1 may be placed on a table or shelf and the pole may not be used.

In embodiments, the light portion 10 may include a top portion 16 with a solar panel 18 mounted on a top surface thereof. In embodiments, an outer cage structure 14 may surround the outer periphery of the light portion 10. In embodiments, the outer cage structure 14 may be made of a durable and electrically non-conductive material. In embodiments, the openings in the cage structure 14 are sufficiently large to allow insects to pass through and enter the interior of the light portion 10. In embodiments the openings in the cage structure are sized to prevent a user from inserting a finger. In embodiments, the outer cage 14 may be embodied by a first portion 14A and a second portion 14B connected together. In embodiments, the cage structure 14 may be an integral structure. In embodiments, the cage structure 14 may include additional segments or portions 3A.

Figure 7:
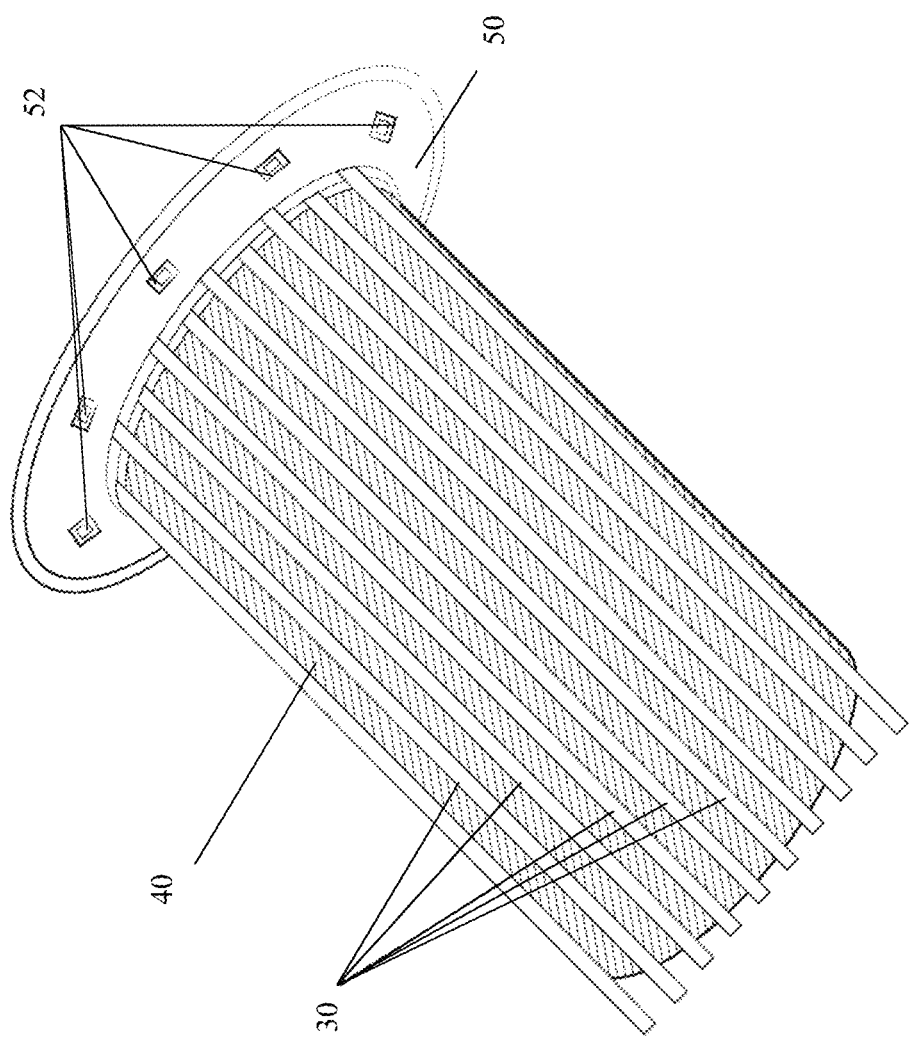
FIG. 7 is a detailed view of a conducting grid of the lighting element of FIG. 1 in accordance with an embodiment of the present disclosure.
Figure 7A:
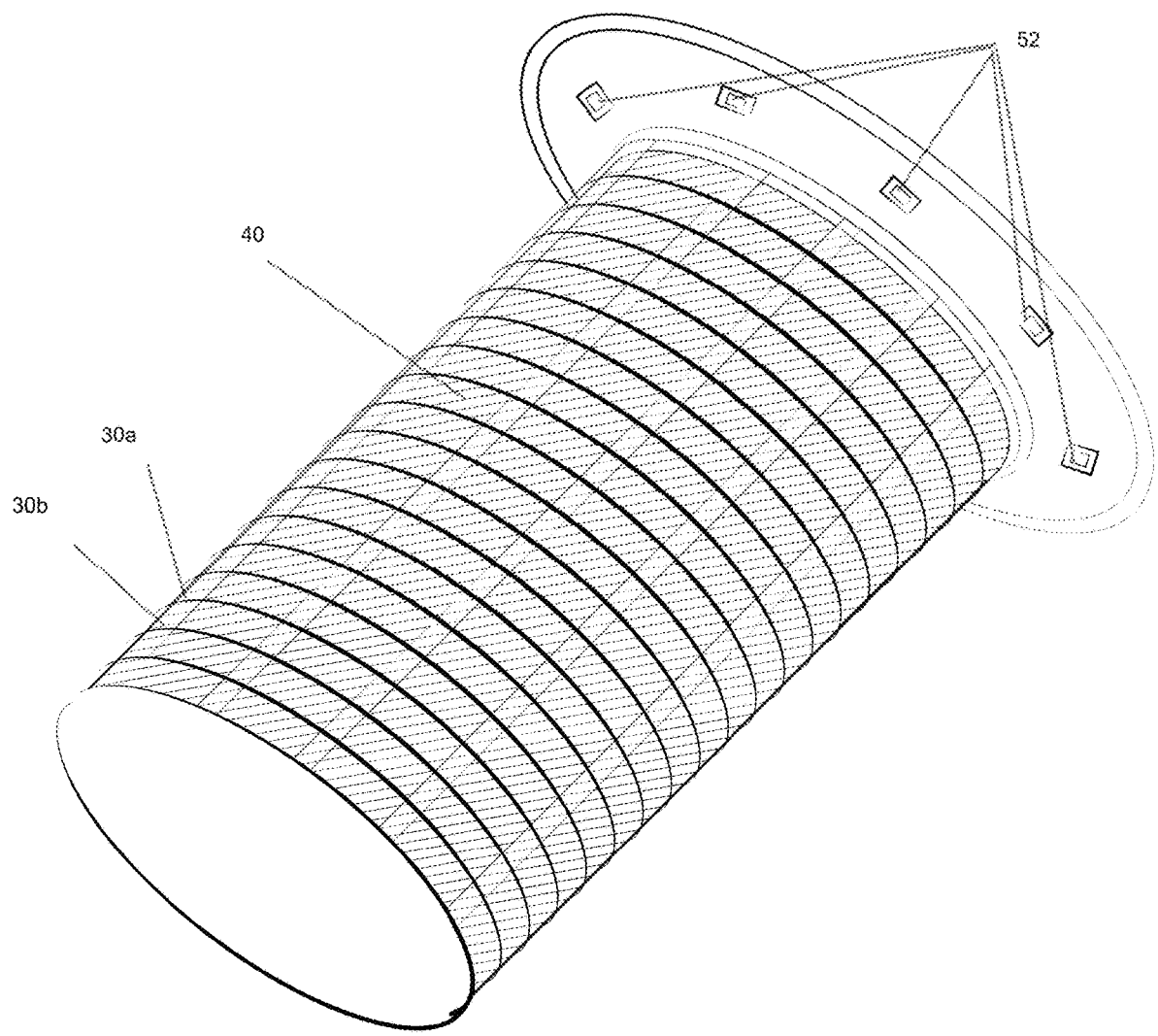
FIG. 7A is a detailed view a conducting grid of the lighting element of FIG. 1 in accordance with another embodiment of the present disclosure.

In embodiments, an electrical conducting grid 30 may be provided inside the outer cage structure 14. In embodiments, the electrical conducting grid 30 may include two groups of conductors 30a, 30b that are positioned adjacent to each other in an alternating pattern (see FIG. 7, for example). In embodiments, the electrical conducting grid 30 is electrified such that when an insect contacts it, they are electrocuted. FIG. 7A illustrates another example of a conducting grid 30 with contacts 30a, 30b positioned in an alternating pattern. In embodiments, the two groups of conductors 30a, 30b may have a voltage established between them such that when an insect contacts a conductor from one group and an adjacent conductor from the other group, the insect is eliminated. In embodiments, one or more UV light sources 52 may be provided on a bottom surface of the top portion 16. In embodiments, the UV light sources 52 are UV light emitting diodes (LEDs). In embodiments, the UV light sources 52 may be activated when the electric grid 30 is energized to attract insects into the light portion 10 and toward the grid 30. In embodiments, the UV light sources 52 may be mounted on a support element 50.

In embodiments, a removable tray 24 may be provided at a bottom of the light portion 10. In embodiments, as insects are eliminated by the grid 30, they will drop down into the tray 24. In embodiments, a screen element 24A may be provided over the tray 24 (see FIG. 3, for example). In embodiments, the tray 24 may be removed periodically to remove the insect remains. In embodiments, a power button or switch 26 may be provided on the light portion 10. In FIG. 4, the power button or switch 26 may be a push button, however, any button, switch or other selector element may be used. The power button 26 may be positioned elsewhere on the light portion 10.

Figure 7B:
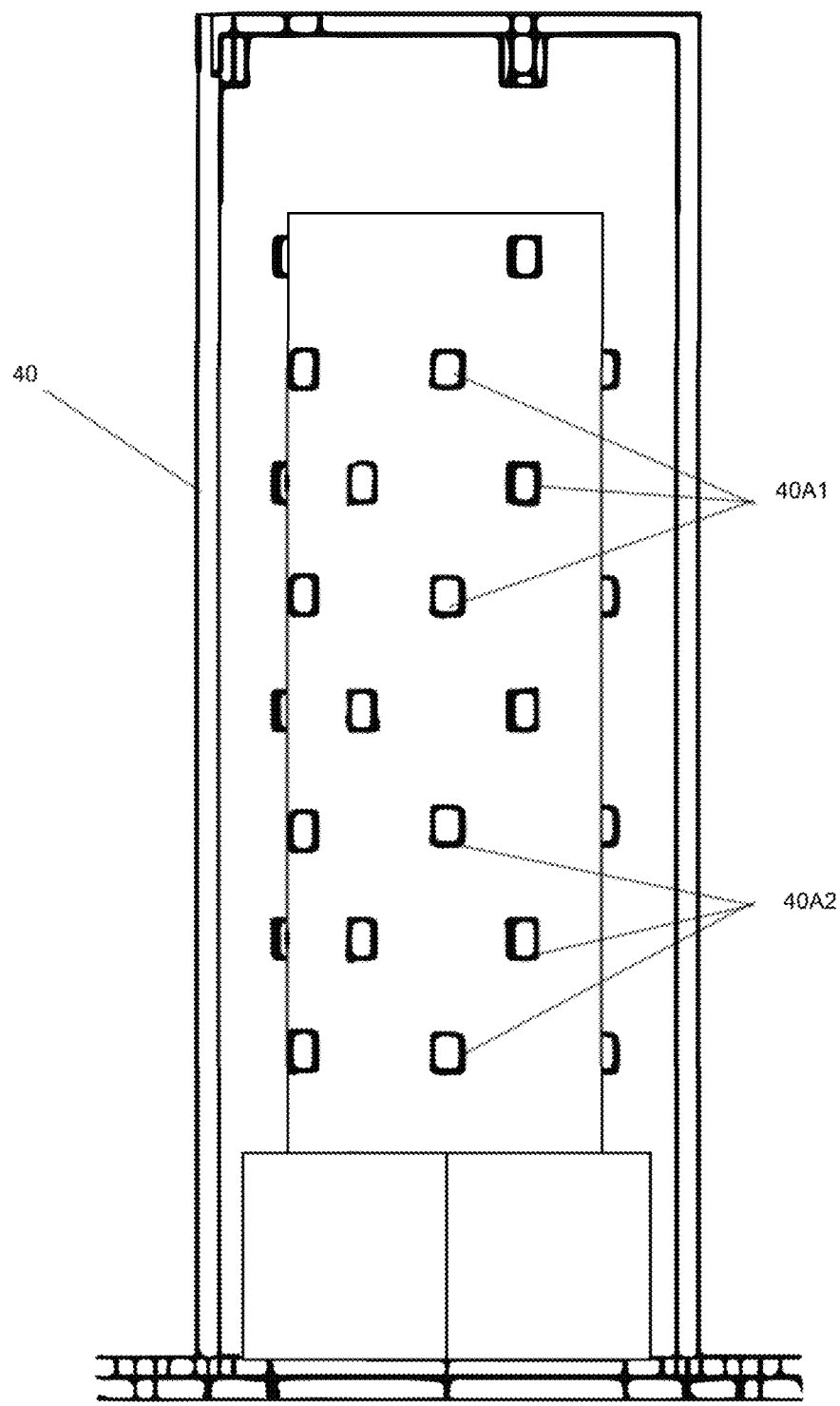
FIG. 7B is a detailed view of a flickering light source of the lighting element of FIG. 1 in accordance with an embodiment of the present disclosure.

In embodiments, a shade 40 may be provided inside the electrical grid 30. In embodiments, the shade 40 may be cylindrical in shape and surrounds a flickering light portion 42 (see FIG. 3) that in combination with the shade simulates the appearance of a flickering flame when activated. In embodiments, the shade 40 may be of any suitable shape provided that is fits within the grid 30. In embodiments, the shade 40 may be tinted or colored to simulate a flickering flame. In embodiments, the flickering light portion 42 may be embodied by a flexible printed circuit board 42 with a plurality of LEDs 42A (see FIG. 3) mounted thereon. In embodiments, the LEDs 42A may be white light LEDs that emit light through the shade 30 which may be tinted or colored to provide the impression of a flame. In embodiments, one or more of the LEDs 42A may be a different color in order to provide the impression of a flame. In embodiment, the LEDs 42A are divided into at least two groups 42A1, 42A2. In embodiments, the first group of the LEDs 42A1 may be driven to blink on and off together. In embodiments, the second group of LEDs 42A2 may be driven to brighten and dim in intensity together as can be seen in FIG. 7B. In embodiments, the second group of LEDs 42A2 may be positioned below the first group of LEDs 42A1 or vice versa. In embodiments, one or more of the light emitting diodes in the first group of LEDs 42A1 or the second group of 42A2 may be of different colors. The combination of the two groups of LEDs, when viewed through the shade 40, which may be tinted or colored as noted above, if desired, provides the impression of a flickering flame behind the grid 30. In embodiments, the flame simulation may attract insects and provides for a positive aesthetic and a warmer feeling than traditional insect eliminators. In embodiments, the LEDs 42A may provide sufficient light to allow users to see the area around the lamp and eliminated the need for additional lighting. When mounted on the pole 3, the light element 10 provides the appearance of an outdoor torch. One advantage of the solar powered lighting element with a simulated flame and an electric insect eliminator 1 is that it provides the aesthetics of a conventional outdoor torch while avoiding the waste products of combustion and the additional labor required to change the oil as well as the hazards of an open flame present in conventional outdoor torches.

In embodiments, a PCB support element 44 (see FIG. 3) may be provided to hold the printed circuit board of the flickering light portion 42 in place. In embodiments, a battery 46B (see FIG. 3) may be mounted in the PCB support element 44 as well. In embodiments, the battery 46B may be a rechargeable battery and may be recharged by the solar panel 18. In embodiments, the battery 46B may be recharged via a line voltage, if desired via a USB, wireless or other connection. In embodiments, the battery 46B may be recharged via any other suitable power source. In embodiments, a charging input or port may be provided for connection to a line voltage or other power source. In embodiments, the battery 46B may be provided elsewhere in the light portion 10. While a battery 46B is illustrated, any other power source may be used. In embodiments, the power source may be any suitable portable power source. In embodiments, the solar panel 18 may provide power directly, without use of the battery 46B.

In embodiments, an LED boost circuit (or control circuit) 46 (see FIG. 3) may be mounted on the bottom surface of the top 16, or elsewhere, which may be used to drive the UV LEDs 52. In embodiments, the boost circuit (control circuit) 46 may be used to drive the LEDs 42A as well. In embodiments, other driving circuitry may be provided to drive the UV LEDs 52 and/or the LEDs 42A. As noted above, the two groups of LEDs 42A1, 42A2 are preferably driven in a particular sequence to simulate a flame.

In embodiments, the power button or switch 26 may be operable to activate the conducting grid 30 without activating the flickering light portion 42. In embodiments, the power button 26 may activate the conducting grid 30 and not the UV LEDs 52, however, typically, the grid and UV LEDs will be activated together. In embodiments, the conducting grid 30, UV LEDs 52 and the flickering light portion 42 will all be activated together by the power button 26. In embodiments, other input elements, other than the power button 26, may be used to provide input to control the conducting grid 30, the UV LEDs 52, and the flickering light portion 42. In embodiments, a light sensor 27 may provide information regrading ambient light levels around the lighting element 1. In embodiments, the lighting element 1 may be activated when the ambient light level drops below a threshold level and may turn off when the light level rises above the threshold. In embodiments, the light sensor 27 may be a photocell, however, any suitable light sensor device may be used. In embodiments, the light sensor 27 may be provided on the solar panel 18. In embodiments, the light sensor 27 may be integrated into the solar panel 18. In embodiments, a separate light sensor 27 may be provided elsewhere on the lighting element 1.

Figure 8:
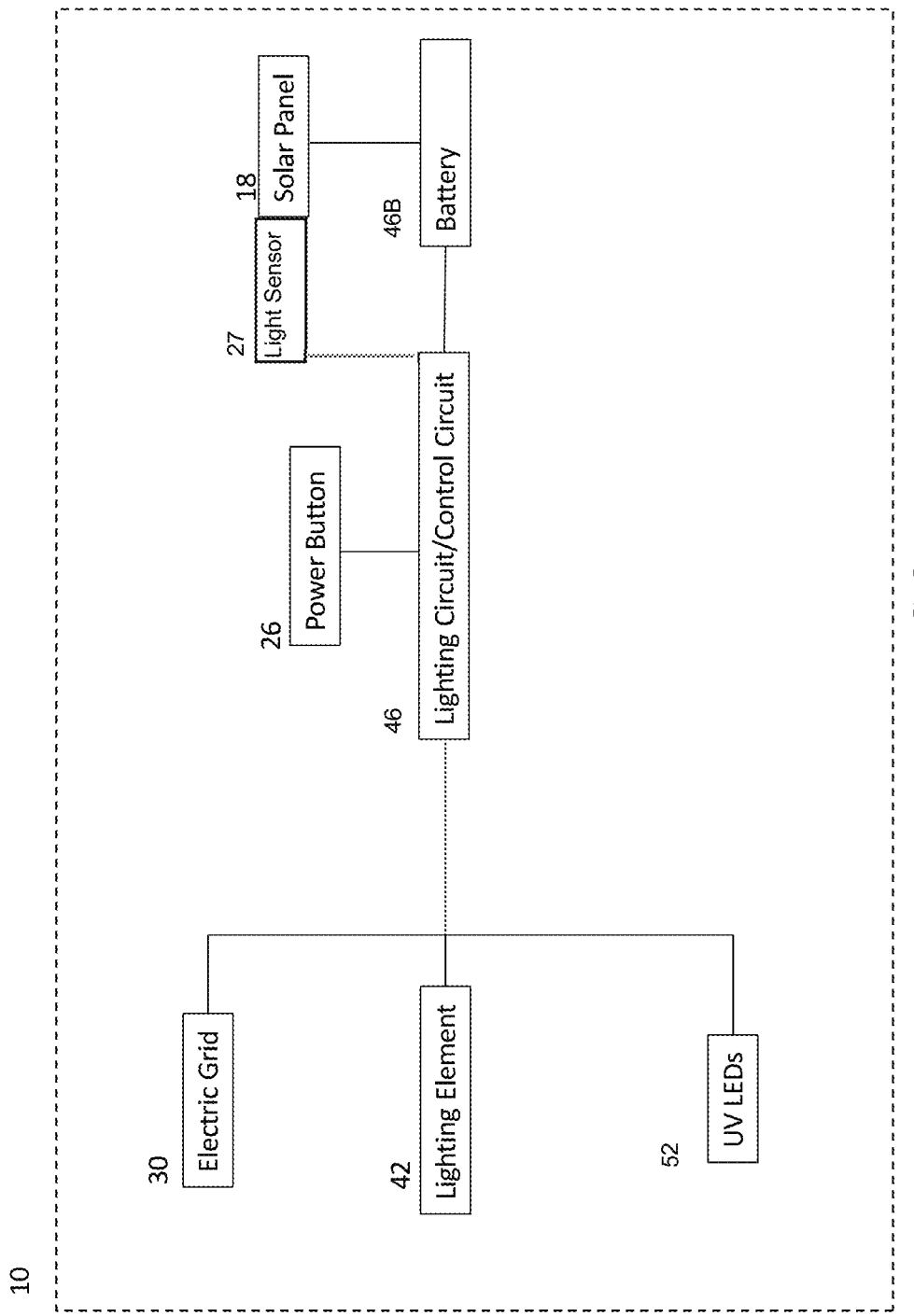
FIG. 8 is an exemplary block diagram of the light portion of FIG. 4 in accordance with an embodiment of the present disclosure.

FIG. 8 illustrates an exemplary block diagram of the light portion 10. In embodiments, the battery 46B provides power to the conducting grid 30, the UV LEDs 52 and the flickering light portion 42. Lighting circuitry (or control circuit) 46, which may be or include the boost circuit 46, and/or other circuitry, may drive the UV LEDs 52 and/or the LEDs 42A1 and 42A2 of the flickering light portion 42. The lighting circuitry 46 may include other control circuitry to control activation of the electric grid 30. As noted above, the LEDs 42A1 and 42A2 may be driven in respective patterns to simulate the appearance of a flickering flame. The solar panel 18 may provide power to recharge the battery 46B. In embodiments, the light portion 10 may include other charging circuitry or inputs to allow for USB or wireless charging, if desired. In embodiments, the lighting circuitry 46 may be connected to the power button 26 and may drive the grid 30, the UV LEDs 52 and the flickering light portion 42 (including the two groups of LEDs 42A1, 42A2), respectively, based on input provided by the button 26. In embodiments, separate control circuitry may be provided and connected to the power button 26 and the control circuit 46 to control the grid 30, the UV LEDs 52 and/or the flickering light portion 42. In embodiments, the light level information provided by the light sensor 27 may be provided to the control circuit 46. In embodiments, the control circuit 46 may include a processor, microprocessor or other control element or component to provide for control of the grid 30, the UV LEDs 52 and the flickering light source 42. In embodiments, control of the grid 30, the UV LEDs 52 and the flickering light source 42 may be based on both input from the power button 26 and the light sensor 27. As noted above, the light sensor 27 may be provided on or integrated with the solar panel 18 and connected to the control circuit 46. In an example, the power button may be used to activate consideration of light level information provided by the sensor 27. In embodiments, the power button 26 may be pressed once, or placed in a first position, to enter a light monitoring mode in which power is provided to one or more of the grid 30, the UV LEDs 52 and the flickering light portion 42 when the light information indicates a light level below a threshold. In embodiments, the one or more of the grid 30, the UV LEDs 52 and the flickering light portion 42 may be deactivated when the light level rises above the threshold. In embodiments, pushing the button 26 again, or putting it in a second position, may directly activate one or more of the grid 30, the UV LEDs 52 and the flickering light portion 42, without consideration of the light level information. In embodiments, as noted above, each of the grid 30, the UV LEDs 52 and the flickering light portion 42 may be activated independently, if desired, based on operation of, or the position of, the power button and/or light level information provided by the light sensor 27. In embodiments, the grid 30 and UV LEDs 52 may be activated independent of the light level information. In embodiments, as noted above, other input elements may provide information to control the grid 30, the UV LEDs 52 and the flickering light portion 42. In embodiments, the lighting element 1 may be placed in an off mode in which all of the grid 30, the UV LEDs 52 and the flickering light source 42 are deactivated and stay that way regardless of light sensor information until activation of the power button 26 or another input.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A lighting element comprising:
   a light portion configured to emit light, the light portion including:
   a top portion;
   at least one cage portion positioned below the top portion;
   a base portion positioned below the at least one cage portion and connected to the top portion via the at least one cage portion;
   a conducting grid element mounted inside the at least one cage portion;
   a shade element mounted inside the conducting grid element; and
   a flickering light source mounted in the shade element and configured to emit light in a predetermined pattern through the shade element; and
   a support element configured to receive and support the light portion.

2. The lighting element of claim 1, wherein the flickering light source comprises:
   a first set of light sources positioned to emit light through the shade element; and
   a second set of light sources positioned to emit light through the shade element,
   wherein the first set of light sources is activated to emit light in a first pattern and the second set of light sources is activated to emit light in a second pattern.

3. The lighting element of claim 2, wherein the first set of light sources and the second set of light sources include a plurality of light emitting diodes.

4. The lighting element of claim 3, wherein at least a first light emitting diode of the first set of light sources and the second set of light sources is a first color and a second light emitting diode of the first set of light sources and the second set of light sources is a second color, different from the first color.

5. The lighting element of claim 4, wherein the first light emitting diode is part of the first set of light sources and the second light emitting diode is part of the second set of light sources.

6. The lighting element of claim 5, where in the first light emitting diode and second light emitting diode are part of the first set of light sources.

7. The lighting element of claim 5, wherein the first light emitting diode and the second light emitting diode are part of the second set of light sources.

8. The lighting element of claim 2, wherein the first set of light sources turn on and off alternately in accordance with the first pattern.

9. The lighting element of claim 2, wherein the second set of light sources alternate between high brightness and low brightness in accordance with the second pattern.

10. The lighting element of claim 1, further comprising at least one control circuit connected to the UV light source, the conducting grid element and the flickering light source and operable to control activation of the UV light source, the conducting grid element and the flickering light source.

11. The lighting element of claim 10, further comprising at least one input element, connected to the control circuit, wherein the control circuit controls the UV light source, the conducting grid element and the flickering light source based on information provided via the at least one input element.

12. The lighting element of claim 10, further comprising a power source, wherein the power source is connected to the control circuit, and the control circuit controls power supplied to the UV light source, the conducting grid element and the flickering light source.

13. The lighting element of claim 1, wherein the support element further comprises an elongated pole configured to support the light portion.

14. The lighting element of claim 13, wherein the elongated pole comprises a plurality of pole segments.

15. The lighting element of claim 1, wherein the support element comprises a base element configured to receive a portion of the base portion of the light portion.

16. The lighting element of claim 1, wherein the at least one cage portion includes:
   a first cage element positioned on a first side of the light portion; and
   a second cage element positioned on a second side of the light portion,
   wherein the first cage element and second cage element are connected to each other to form the at least one cage portion.

17. The lighting element of claim 1, further comprising a UV light portion including a plurality of UV light emitting diodes spaced around an outer periphery of the top portion.

18. The lighting element of claim 1, wherein the shade element comprises a partially transparent material.

19. The lighting element of claim 1, further comprising:
a power source; and
at least one solar panel mounted on a top surface of the top portion and connected to the power source such that the power source is recharged by electricity provided by the at least one solar panel.

20. The lighting element of claim 1, further comprising:
a power source; and
a charging circuit connected to the power source and configured to recharge the power source.

* * * * *